United States Patent [19]
Refugio et al.

[11] Patent Number: 5,673,025
[45] Date of Patent: Sep. 30, 1997

[54] FLUID LEAK DETECTOR MECHANISM

[75] Inventors: Maria Rosalyn Bengua Refugio, Milwaukee; Mark Edward Lamb, Mayville, both of Wis.; Gordon Le Roy Marquart, Jesup, Iowa

[73] Assignee: Deere & Company, Moline, Ill.

[21] Appl. No.: 753,200

[22] Filed: Nov. 21, 1996

[51] Int. Cl.$^6$ ................................................ G08B 21/00
[52] U.S. Cl. ............................ 340/605; 340/603; 73/49.2; 73/295; 73/290 R
[58] Field of Search .................................... 340/605, 603, 340/619, 616; 73/49.2, 295, 290 R, 40

[56] References Cited

U.S. PATENT DOCUMENTS

| | | | |
|---|---|---|---|
| 4,591,837 | 5/1986 | Martinez | 340/605 |
| 5,254,976 | 10/1993 | Schueler | 340/605 |
| 5,402,110 | 3/1995 | Oliver et al. | 340/605 |

OTHER PUBLICATIONS

Toro, brochure entitled "The Greensmaster® 3100", 1 page, date unknown, published in the U.S.A.

Jacobsen Textron, Jacobsen Division of Textron Inc., brochure entitled "GreenSentry™ Oil System Monitor: On Alert for You Available for LF–100™ and Greens King® IV Mowers", 1 page, published in the U.S.A. in 1992.

*Primary Examiner*—Jeffery Hofsass
*Assistant Examiner*—Sihong Huang

[57] ABSTRACT

A fluid leak detector mechanism having a main fluid tank, an expansion tank for receiving fluid therefrom as the fluid becomes heated and expands, and a sensing chamber operatively coupled with the main tank. A signalling mechanism signals to an operator when the level of fluid in the sensing chamber has dropped significantly to alert the operator of the presence of a leak. An oil return valve is operatively coupled between the main tank and the expansion tank and has an open position that allows fluid to flow back to the main tank from the expansion tank and a closed position that blocks oil from flowing from the expansion tank to the main tank. A temperature sensor senses the temperature of fluid. A control mechanism shifts the oil return valve to its open position when the temperature sensor detects a significant drop in fluid temperature, thereby allowing the fluid levels to be reset with changes in fluid temperature.

28 Claims, 6 Drawing Sheets

FLUID LEAK DETECTOR MECHANISM

1) FIELD OF THE INVENTION

This invention relates to hydraulic fluid leak detectors which alert an operator to leaks in a hydraulic system of a reel mower vehicle such as that used to mow golf course greens.

2) BACKGROUND OF THE INVENTION

Conventional golf course turf mowers include a plurality of reel mowers which are capable of cutting grass very short and precisely. These mower vehicles typically include hydraulic systems that supply power to the vehicle's ground engaging drive wheels, to the reel mower cutting units, and to the hydraulic lift cylinders that lift and lower the reel mower cutting units to and from the ground between operating and transport positions. These hydraulic systems can develop leaks that allow hydraulic oil to spill onto the surface of the turf or green. Spilled oil can damage or kill the grass it contacts. The operators may be unaware that a leak is present, and therefore may continue mowing operations for a relatively long period of time before realizing the leak is occurring. When this happens, the leaking hydraulic fluid will be deposited on the surface of the turf or green in long lines as the mower travels across the turf. The grass beneath the spilled oil often dies, leaving long strips of unsightly dead turf on the turf.

Several mechanisms have been developed for detecting hydraulic fluid leaks and warning the operator of such leaks so that mowing operations can be stopped, the leak can be fixed, and damage to the green can be minimized. One such device is shown in U.S. Pat. No. 4,591,837 issued to Martinez. This type of device includes a float that floats on the surface of the hydraulic fluid contained within a float chamber which extends upwardly from the hydraulic system's reservoir. When a hydraulic leak develops, fluid will spill onto the ground, causing the fluid level in the float chamber to drop. As the fluid level drops, the float will eventually abut a pair of electrical contacts, which activates a circuit which signals to the operator that a leak may be present. This device includes an overflow chamber that receives expanding fluid via the float chamber when the fluid heats up during mowing operation. This device therefore generally compensates for increases in fluid volume caused by heat. If the fluid cools, it will contract causing the fluid level to drop. As the fluid level drops due to thermal contraction, false alarms will be triggered as the float abuts the electrical contacts. The Martinez patent teaches a drainback feature that includes a restricted passageway that allows fluid in the overflow chamber to flow back into the float chamber before re-starting the equipment. The drainback feature therefore serves to direct the fluid back to the float chamber as the fluid cools after mowing operations. During operation, if a fluid leak occurs that deposits oil on the ground at a rate slower than the flow of fluid through the drainback channel, then this device will be slow or fail to detect such a leak since the level of fluid in the float chamber will drop only slowly, if at all. The Martinez patent also teaches that before re-starting the equipment, an operator can manually unscrew a portion of the float chamber to allow fluid in the overflow chamber to flow back into the float chamber. Therefore, this type of leak detector device generally does not provide a mechanism for compensating for contraction of the hydraulic fluid if the fluid cools down during operation. Such thermal contraction during mowing operations could cause false alarms to be sounded, causing unnecessary interruptions and delays in mowing operations.

A second type of leak detector includes a device which calculates the amount of thermal contraction or expansion that should occur given the current temperature of the fluid, and from this calculation assesses whether a leak has occurred. This device therefore continuously compensates for thermal contraction. This type of device can be relatively complicated and costly due to the processor that calculates the volume of fluid in the system based on the fluid temperature.

Therefore, it would be desirable to provide a hydraulic leak detector that informs the vehicle operator when the hydraulic system is losing fluid via a leak. It would be desirable for such a device to compensate for thermal expansion caused by increases in the fluid temperature during normal operation. It would also be desirable for such a mechanism to compensate for thermal contraction that may occur during vehicle operation such that false alarms are not triggered. It would be desirable for such a device to be simple in construction and relatively inexpensive to manufacture and operate.

SUMMARY OF THE INVENTION

The present invention provides a hydraulic fluid leak detector adapted for use on a vehicle having hydraulically driven reel mower cutting units. A main tank is coupled with an expansion tank by way of a first hydraulic line. As fluid within the main tank and the vehicle's hydraulic system heats up, the expanding fluid will flow from the main tank through an expansion check valve in the first hydraulic line and into the expansion tank. A sensing chamber is coupled with the main tank via a second hydraulic line. When leaks occur in the hydraulic system, the fluid level in the sensing chamber will drop. An optical sensor mounted with the sensing chamber detects when the level of fluid in the sensing chamber drops below the optical sensor. A control module connected with the optical sensor triggers an audible alarm or warning light when the fluid level in the sensing chamber drops, and thereby warns the vehicle operator that a fluid leak may be present.

A temperature sensor mounted with the main tank detects temperature drops in the hydraulic fluid. When the temperature drops approximately two degrees, the control module will temporarily open an oil return valve to allow fluid to flow from the expansion tank back into the main tank. The control module also opens an air vent valve that allows air to exit the sensing chamber as it fills with fluid from the main tank. This feature allows the fluid levels to be reset in the main tank, expansion tank and sensing chamber when fluid temperature drops occur, and thereby generally prevents false alarms from being sounded after thermal contraction.

The control module also senses when the reel mower cutting units are being lowered to the ground such that hydraulic fluid exits the cutting unit lift cylinders. The fluid leaving the lift cylinders causes fluid to flow from the hydraulic system back into the tank, which in turn causes the level of fluid in the sensing chamber to rise. The control module opens the air vent valve to allow air to be displaced from the sensing chamber as fluid enters the sensing chamber in response to the lift cylinders being retracted. The sensing chamber is sized such that the extension of the lift cylinder to lift the cutting units will cause the fluid level in the sensing chamber to drop but not below the optical sensor. The occurrence of false alarms caused during lift operations are thereby reduced or eliminated.

DETAILED DESCRIPTION OF THE PREFERRED EMBODIMENT

Figure 1:
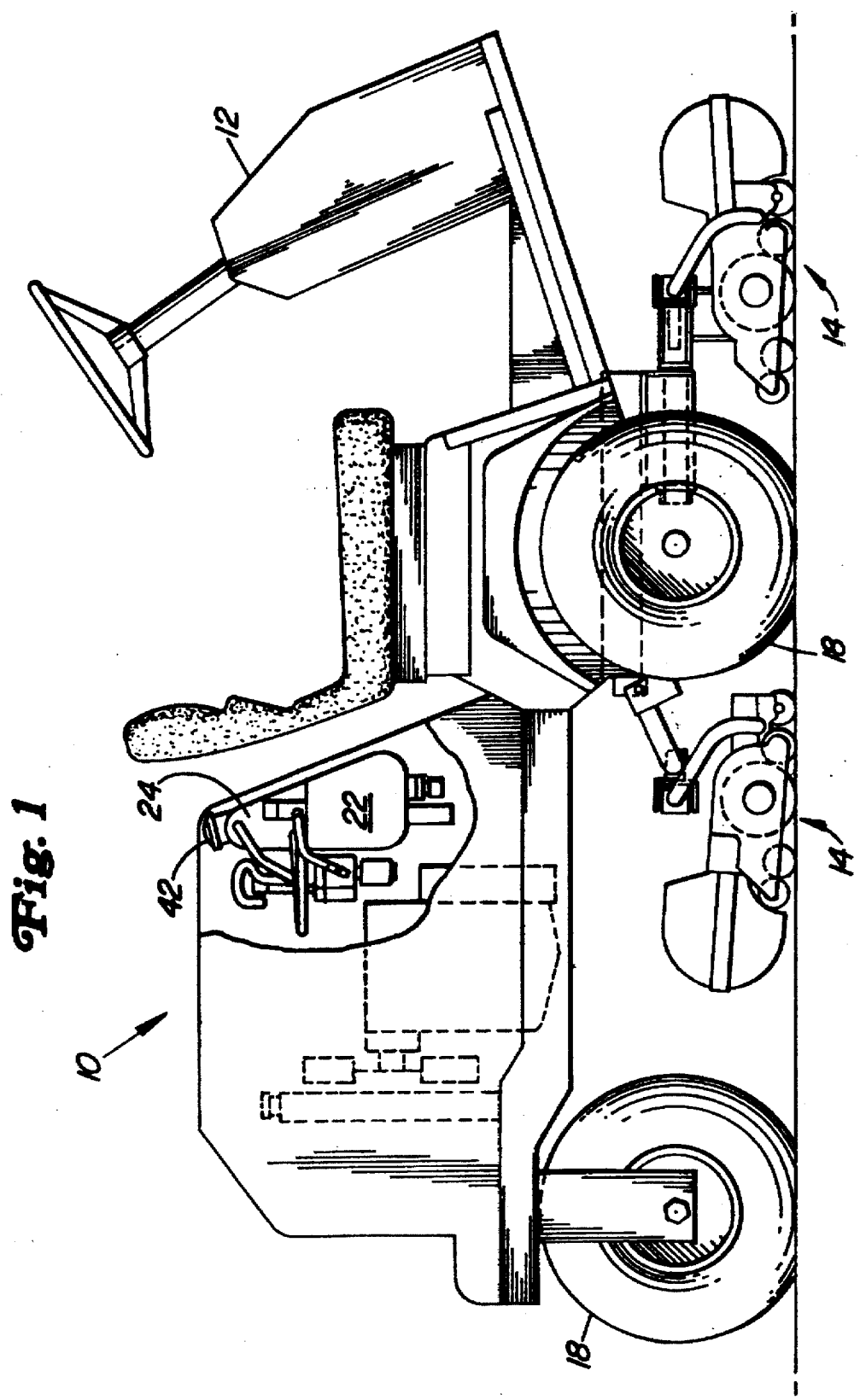
FIG. 1 is side view of a vehicle having reel mower cutting units and which includes a leak detector mechanism according to the present invention.
Figure 2:
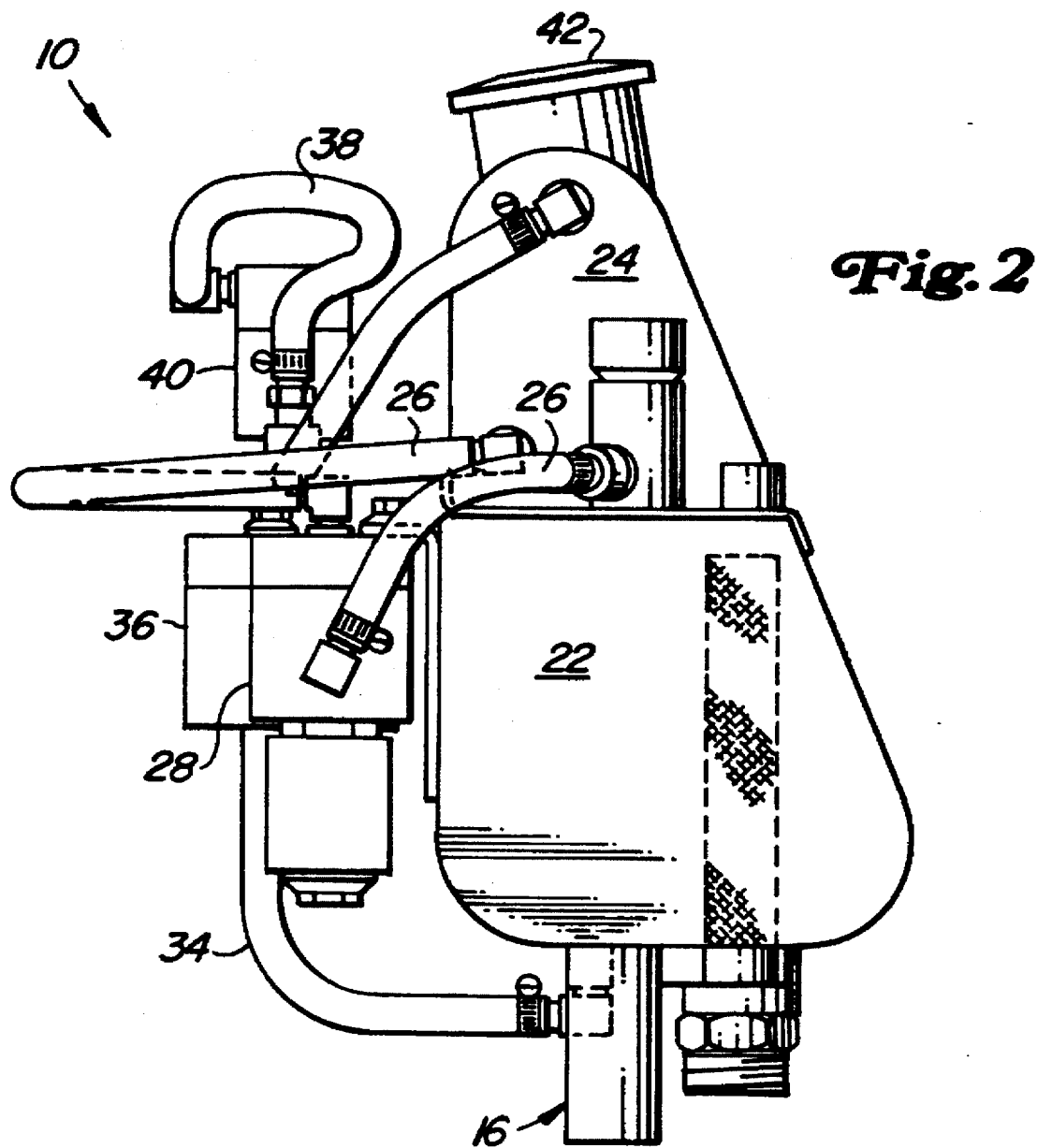
FIG. 2 is a side view of the leak detector mechanism shown in FIG. 1.
Figure 3:
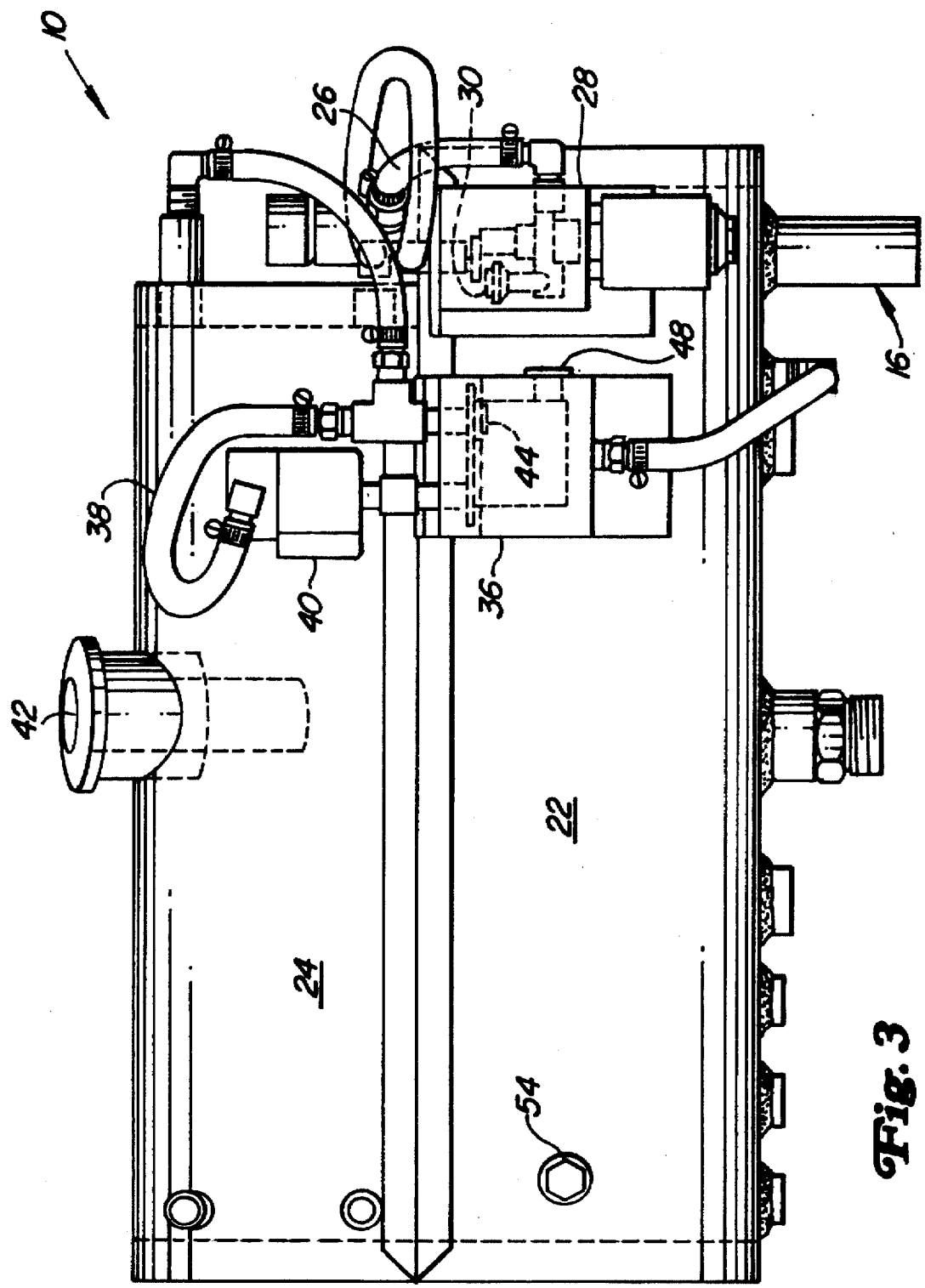
FIG. 3 is a view from the rear of the leak detector mechanism shown in FIG. 2.

Referring now to FIGS. 1–7, there is shown the preferred embodiment of the leak detector 10 according to the present invention. The leak detector mechanism 10 is adapted for use with a vehicle 12 that includes a plurality of reel mower cutting units 14 for cutting turf areas on golf courses, such as golf course greens. The leak detector 10 is operatively coupled with the vehicle's hydraulic system 16 which is adapted for powering the vehicle's drive wheels 18, the blades of the cutting units 14, and the hydraulic lift cylinders 20 which shift the reel mower cutting units 14 between raised transport positions and lowered operating positions.

The leak detector 10 includes a main tank or reservoir 22 of hydraulic fluid which is available for use by the hydraulic system 16. An expansion tank 24 is provided above the main tank 22 for receiving expanding hydraulic fluid from the main tank 22 as fluid temperatures increase. A first hydraulic line 26 extends between the main tank 22 and the expansion tank 24 for allowing fluid to flow therebetween during thermal expansion as described in more detail below. Operatively coupled with the first hydraulic line 26 is a solenoid operated oil return valve 28 which is shiftable between open and closed modes. In the closed mode, fluid is blocked from flowing from the expansion tank 24 to the main tank 22. In the open mode, fluid can flow freely through the oil return valve 28 between the expansion tank 24 and main tank 22. An expansion check valve 30 is coupled with a bypass portion 32 of hydraulic line. The expansion check valve 30 and bypass line 32 allow hydraulic fluid to flow from the main tank 22 to the expansion tank 24 when the fluid expands with increases in temperature.

A second hydraulic line 34 operatively extends between the bottom of the main tank 22 and the bottom portion of a sensing chamber 36. A third hydraulic line 38 extends from the top of the sensing chamber 36 to a top portion of the expansion tank 24. A solenoid operated air vent valve 40 is operatively coupled with the third hydraulic line 38 and is selectively shiftable between open and closed positions. In the open position, air is allowed to flow out of the sensing chamber 36 and into the top portion of the expansion tank 24 where it can be vented into the atmosphere through a vented cap 42 at the top of the expansion tank 24. In the closed mode, the air vent valve 40 prevents air from flowing therethrough between the sensing chamber 36 and expansion tank 24. An air vent check valve 44 is operatively coupled between the sensing chamber 36 and the third hydraulic line 38 and allows air at atmospheric pressure within the expansion tank 24 to flow into the sensing chamber 36 to replace fluid that has flowed out of the sensing chamber 36, as will be described in greater detail below.

The present invention provides a signalling mechanism 46 which signals to the operator when the level of fluid in the sensing chamber 36 has dropped significantly and that a fluid leak may be occurring. An optical level sensor 48 is coupled with the sensing chamber 36 for optically sensing the level of fluid in the sensing chamber 36. If the level of hydraulic fluid in the sensing chamber 36 drops below the optical sensor 48, a signal is sent by a control module 50 to a warning device 52 which sets off an audible alarm and/or and warning light. This alarm and light indicate to the operator that a leak may be present in the hydraulic system 16. In other words, if a leak is present in the hydraulic system 16, fluid will flow out of the leak, and fluid from the main tank 22 will flow into the hydraulic system 16 to replace the leaked fluid. Fluid from the sensing chamber 36 will flow into the main tank 22 via the second hydraulic line 34 to replace the fluid that has exited the main tank 22 to replace the leaked fluid. As fluid flows out of the sensing chamber 36 in this manner, the fluid level in the sensing chamber 36 drops until it is below the optical sensor 48. The alarm 52 will then be sounded, and the operator can then stop mowing operations to thereby minimize damage to the turf surface.

A temperature sensor 54 is coupled with the main tank 22 for sensing the temperature of hydraulic fluid contained therein. The temperature sensor 54 is operatively coupled with the control module 50 to which the solenoid operated air vent valve 40 and solenoid operated oil return valve 28 are operatively connected. When the temperature of fluid in the main tank 22 drops a predetermined amount, for example, 2° F., the control module 50 will open the solenoid valves 28 and 40 temporarily, for example, approximately twenty seconds, to allow fluid and air to flow therethrough. The fluid levels will then reset themselves to new levels corresponding to the new temperature. As the temperature of fluid in the main tank 22 drops, the fluid will contract, thereby causing the fluid level in the sensing chamber 36 to drop. This drop in fluid level would eventually be detected by the optical sensor 48, thereby triggering a false alarm of a hydraulic fluid leak. By resetting the fluid levels in the various tanks 22, 24 and 36 when the solenoid valves 28 and 40 are briefly opened by the control module 50 after a temperature drop is detected, the occurrence of false alarms is generally reduced or eliminated.

Figure 4:
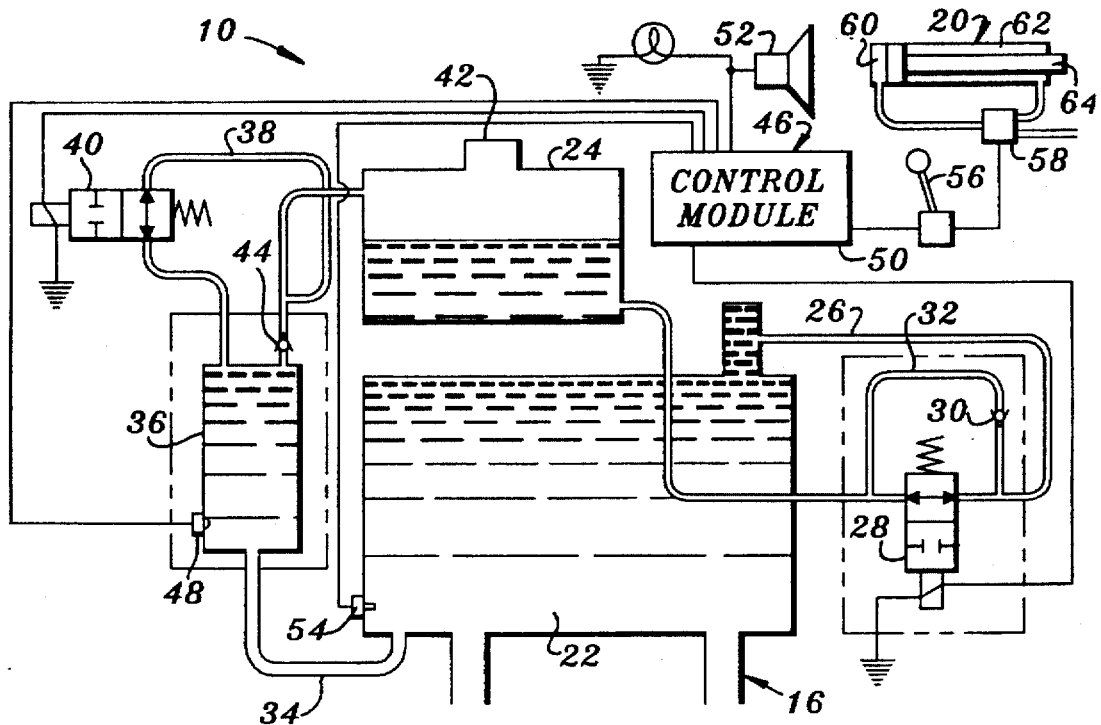
FIG. 4 is a schematic view of the leak detector mechanism according to the present invention when the vehicle is at rest before being started, the oil return valve and air vent valve being open.
Figure 5:
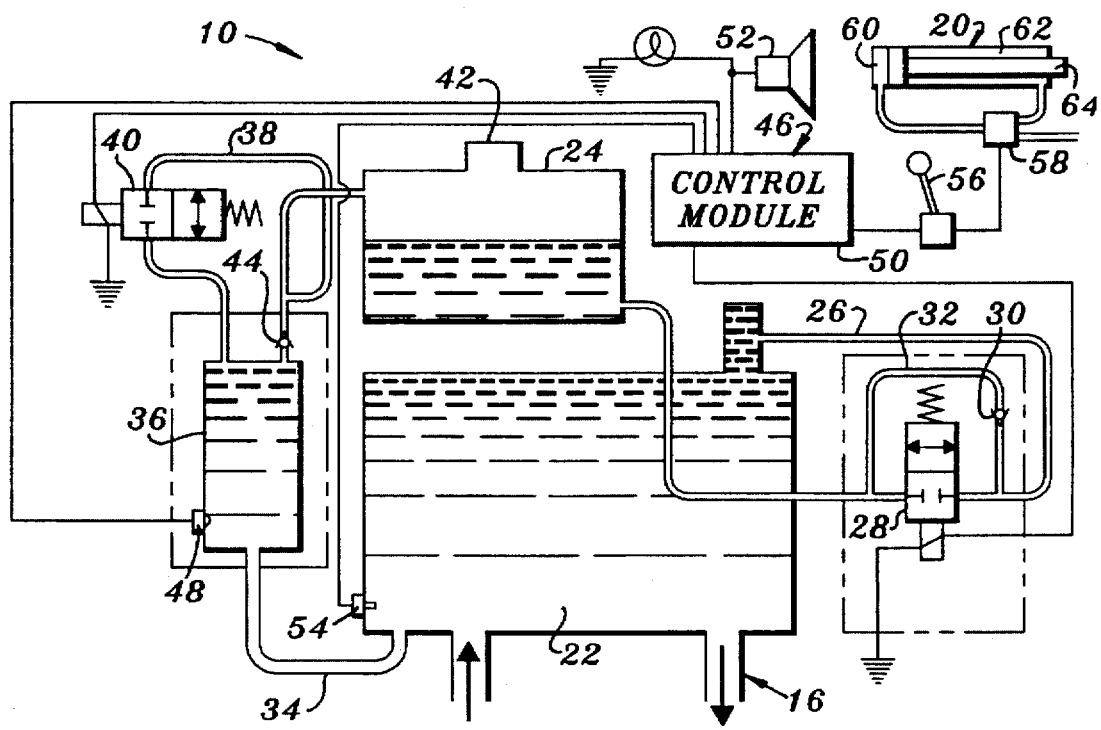
FIG. 5 is a schematic view of the leak detector mechanism while the vehicle is running. The system is in its leak detecting mode with the oil return valve and air vent valve closed.
Figure 6:
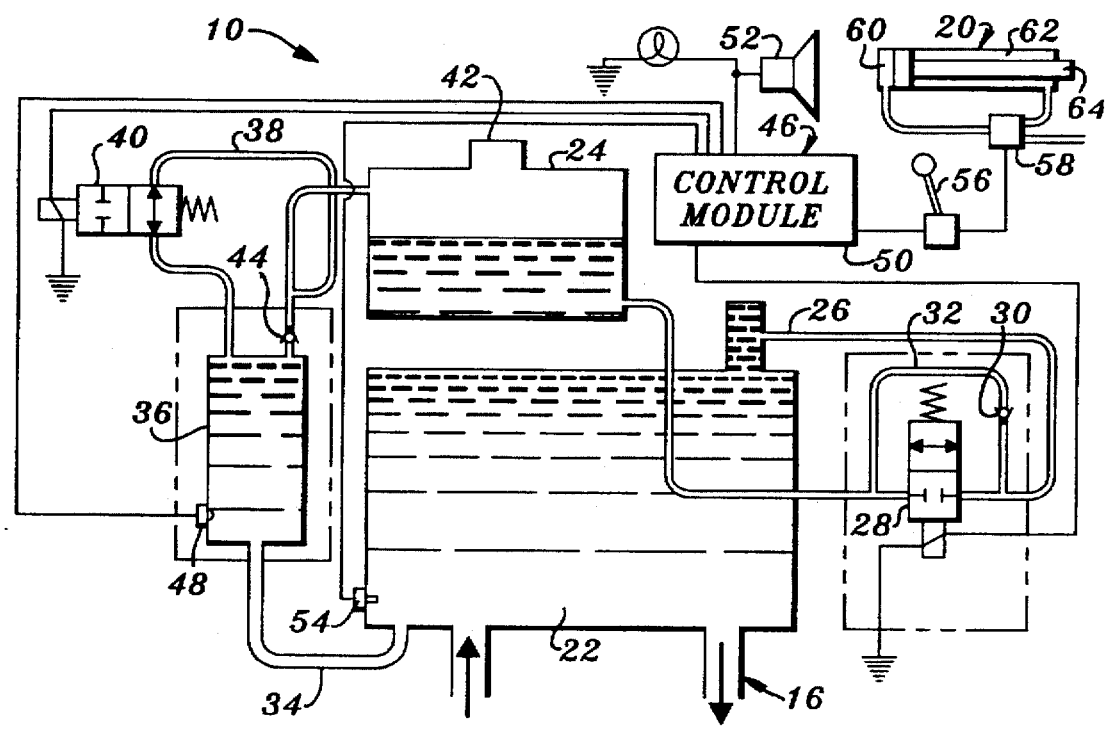
FIG. 6 is a schematic view of the leak detector mechanism when the hydraulic lift cylinders are retracting for lowering the cutting units to the ground, wherein the air vent valve is open and the oil return valve is closed.
Figure 7:
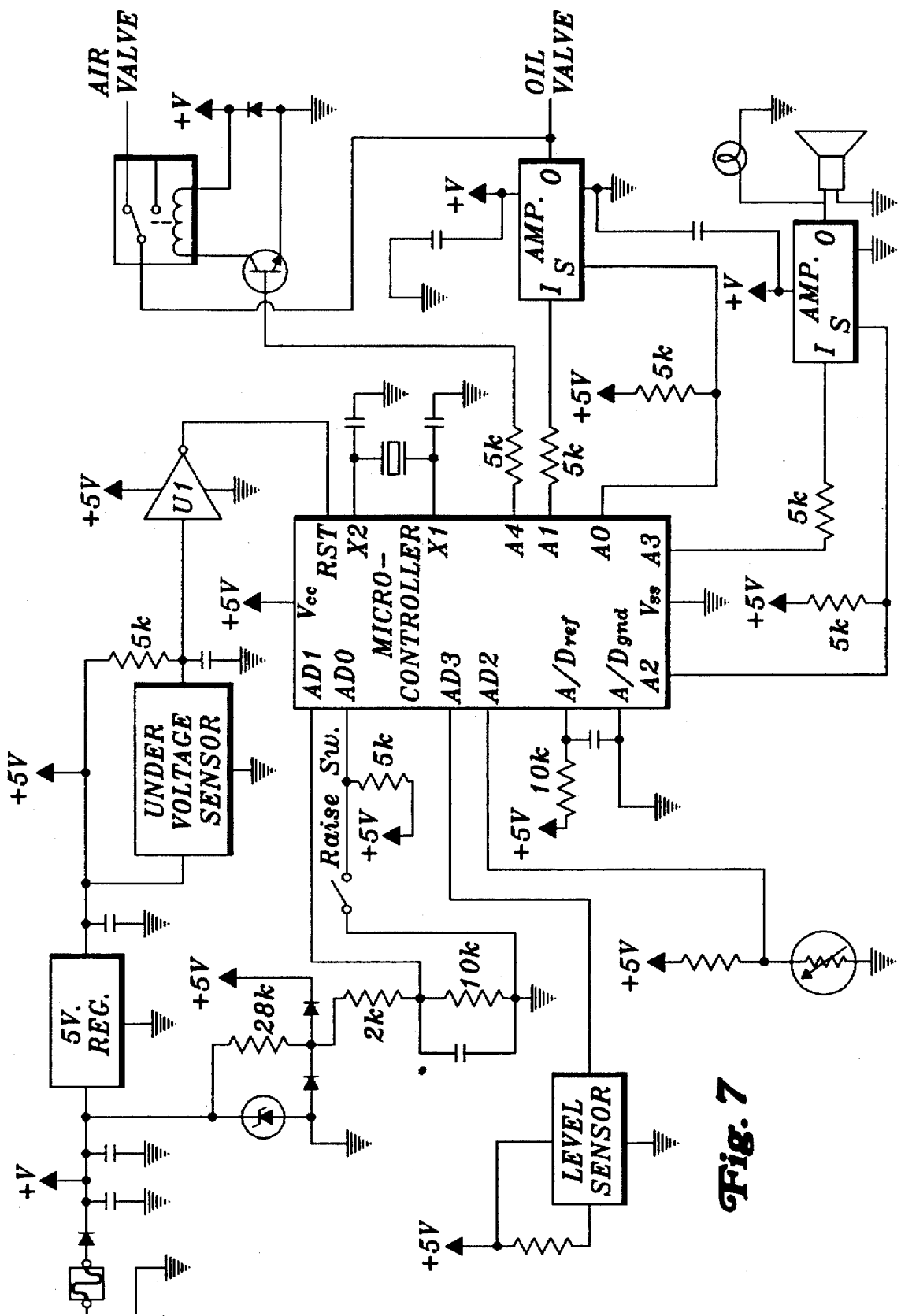
FIG. 7 is a schematic view of the electronic circuitry of the present leak detector mechanism.

Next, the operation of the present invention will be described in greater detail. Referring now to FIG. 4, there is shown schematically the configuration of the present invention before the mower vehicle 12 is started. Both the air vent valve 40 and the oil return valve 28 are open, which allows hydraulic fluid to flow through the first and second hydraulic lines 26 and 34 between the main tank 22, expansion tank 24 and sensing chamber 36 and thereby seek its own level. The main tank 22 and sensing chamber 36 are generally completely full in this mode. When the mower vehicle 12 is started, the control module 50 shifts the air vent valve 40 and oil return valve 28 to their closed positions, as shown in FIG. 5, and the main tank 22 and sensing chamber 36 are generally completely full. In this configuration, the present invention 10 is adapted for detecting leaks of hydraulic fluid during operation of the vehicle 12. When a leak occurs, fluid will flow out of the leak, and fluid from the main tank 22 will flow into the hydraulic system 16 to replace the leaked fluid. Fluid from the sensing chamber 36 will simultaneously flow into the main tank 22 to replace the fluid that has exited the main tank 22. Air will be drawn into the sensing chamber 36 through the air vent check valve 44 to fill the space within the sensing chamber 36 vacated by the exiting fluid. As the fluid flows out of the sensing chamber 36, the fluid level in the sensing chamber 36 drops until it eventually falls below the optical sensor 48. The control module 50 to which the optical sensor 48 is connected will then trigger an alarm 52 which notifies the operator that a leak is present. The operator can then stop operation of the vehicle 12 to thereby minimize the amount of hydraulic fluid that will leak onto and damage the turf.

The leak detector 10 shown in FIGS. 1–6 is adapted to compensate for thermal expansion of the hydraulic fluid during operation. As the hydraulic fluid becomes heated during vehicle operation, the expanding fluid can flow from the main tank 22 to the expansion tank 24 via the first hydraulic line 26, bypass line 32 and expansion check valve 30. The fluid level in the sensing chamber 36 will remain relatively unchanged as thermal expansion occurs. If the expanding fluid were allowed to accumulate in the sensing chamber 36, the expanding fluid might cause the fluid level in the sensing chamber 36 to remain constant when a leak is present, which would effectively conceal fluid losses caused by a hydraulic fluid leak. The alarm would not be triggered in that situation even if a fluid leak were present. The flow of fluid into the expansion tank 24 from the main tank 22 during thermal expansion allows the fluid level in the sensing chamber 36 to remain generally unaffected by thermal expansion. Leaks are therefore detected by the present invention relatively accurately.

The leak detector device 10 according to the present invention also compensates for thermal contraction that may occur in the fluid if the fluid temperature drops. If the temperature of fluid within the main tank 22 drops during operation, the fluid will contract, causing the level of fluid in the sensing chamber 36 to drop. If the fluid contraction is significant enough the fluid level in the sensing chamber 36 might drop below the optical sensor 48, thereby triggering a false alarm. The temperature sensor 54, control module 50 and solenoid valves 28 and 40 according to the present invention operate to reduce or eliminate the occurrence of such false alarms caused by thermal contraction. When the temperature sensor 54 senses a drop in fluid temperature, the control module 50 will open the air vent valve 40 and the oil return valve 28. The open oil return valve 28 allows fluid to flow from the expansion tank 24 to the main tank 22 via the first hydraulic line 26 to occupy the space vacated within the main tank 22 by the contracting fluid. As fluid flows from the expansion tank 24 into the main tank 22, fluid will also flow from the main tank 22 to the sensing chamber 36 via the second hydraulic line 34. The open air vent valve 40 allows air to escape from the sensing chamber 36 into the expansion tank 24 as fluid enters the sensing chamber 36. The air that is vented from the sensing chamber 36 will enter the expansion tank 24 and may be vented to the atmosphere through the vented cap 42. As fluid flows from the expansion tank 24 through the first hydraulic line 26 and oil return valve 28, the main tank 22 will again be completely filled and the level in the sensing chamber 36 will be reset. In this manner the system 10 automatically resets itself during operation when a temperature drop is sensed in the fluid. This will generally reduce the number of occurrences of false alarms caused by thermal contraction of the fluid.

The hydraulic system 16 to which the main tank 22 feeds fluid includes a plurality of double acting hydraulic cylinders 20 which extend and retract to lift and lower the cutting units 14. To raise the cutting units 14, the operator engages a lever 56 which operates hydraulic valves 58 which in turn direct fluid from the system 16 into the piston end 60 of the hydraulic lift cylinders 20 and out of the rod end 62 of the hydraulic lift cylinders 20, which causes the cylinders 20 to extend for lifting the cutting units 14. As the cylinder 20 extends, the fluid flowing into the piston end 60 of the cylinder 20 must fill the space vacated by the rod 64, and therefore more fluid will flow into the piston end 60 of the cylinder 20 during extension than will flow out of the rod end 62. This creates a net inflow of fluid into the cylinder 20 from the hydraulic system 16. During the net inflow of fluid into the hydraulic cylinder 20 from the hydraulic system 16, the fluid that is displaced from the hydraulic system 16 is replaced by fluid from the main tank 22. The closed oil return valve 28 blocks fluid in the expansion tank 24 from flowing into the main tank 22 to replace the exiting fluid, but fluid from the sensing chamber 36 will flow into the main tank 22 to replace the fluid that has flowed out of the main tank 22. Air will flow through the air vent check valve 44 and into the sensing chamber 36 to fill the space vacated by the fluid that has left the sensing chamber 36 for the main tank 22. The air vent valve 40 remains closed and prevents fluid and air from flowing therethrough. The sensing chamber 36 is sized such that the flow of fluid out of the sensing chamber 36 as the lift cylinders 20 are extended will not cause the fluid level in the sensing chamber 36 to drop beneath the optical sensor 48. This helps reduce or eliminate the occurrence of false alarms as the lift cylinders 20 are actuated.

To lower the cutting units 14 to the ground from their raised transport positions, the operator will manipulate the lever 56, which causes valves 58 to allow fluid to flow out of the piston end 60 of the hydraulic cylinders 20 and into the hydraulic system 16, and directs fluid into the rod end 62 of the cylinder 20 for allowing the hydraulic cylinders 20 to retract. Once retracted, the rod 64 will occupy space within the cylinder 20 that was previously occupied by fluid. This will cause a net outflow of fluid from the cylinder 20 and into the hydraulic system 16 during retraction of the cylinder 20 as the cutting units 14 are lowered to the ground. This will force fluid from the hydraulic system 16 back into the main tank 22 and into the sensing chamber 36. The closed oil return valve 28 generally blocks fluid from flowing from the main tank 22 into the expansion tank 24. The control module 50 is operatively coupled with the control lever 56 and is thereby adapted for sensing when the hydraulic lift cylinders 20 retract for lowering the cutting units 14, and will automatically open the air vent valve 40 to the position shown in FIG. 6. The open air vent valve 40 allows air to flow out of the sensing chamber 36 as fluid flows in from the main tank 22 during retraction of the hydraulic cylinders 20. The sensing chamber 36 is sized such that the fluid which enters the sensing chamber 36 during retraction of the lift cylinders 20 will generally fill the sensing chamber 36 but will not flow from the sensing chamber 36 up into the third hydraulic line 38 or expansion tank 24. Fluid that might splash into the third hydraulic line 38 during retraction of the lift cylinders 20 will either drop back into the sensing chamber 36 through the air vent valve 40 or come to rest on the air vent check valve 44 where it will drain back into the sensing chamber 36 the next time the air vent check valve 44 opens. The serpentine routing of the third hydraulic line 38 generally prevents any fluid from splashing from the sensing chamber 36 into the expansion tank 24 or out into the atmosphere.

I claim:

1. A fluid leak detector mechanism, comprising:
   a main fluid tank,
   an expansion tank operatively coupled with the main tank for receiving fluid therefrom as the fluid becomes heated and expands,
   a sensing chamber operatively coupled with the main tank,
   a signalling mechanism which signals to an operator when the level of fluid in the sensing chamber has dropped significantly and that a fluid leak may be occurring,
   an oil return valve operatively coupled between the main tank and the expansion tank, said oil return valve having an open position that allows fluid to flow back to the main tank from the expansion tank and a closed position that blocks oil from flowing from the expansion tank to the main tank,
   a temperature sensor for sensing the temperature of fluid, and
   a control mechanism operatively coupled with the temperature sensor and the oil return valve for shifting the oil return valve to its open position when the temperature sensor detects a significant drop in fluid temperature.

2. The invention of claim 1, and further comprising an expansion check valve operatively positioned between the main tank and the expansion tank for allowing fluid to flow from the main tank to the expansion tank as fluid in the main tank becomes heated and expands, and said expansion check valve blocks fluid from flowing from the expansion tank to the main tank.

3. The invention of claim 1, and further comprising an air vent check valve operatively coupled with the top portion of the sensing chamber for allowing air to enter the sensing chamber to replace oil that has exited the sensing chamber during operation.

4. The invention of claim 1, and further comprising an air vent valve operatively coupled with the top portion of the sensing chamber, said air vent valve having a closed position for blocking fluid from entering or exiting the sensing chamber via the air vent valve, said air vent valve being automatically shifted to an open position as fluid enters the sensing chamber to thereby allow air to be displaced from the sensing chamber as fluid enters the sensing chamber.

5. The invention of claim 1, and further comprising a hydraulic line which operatively extends between the top portion of the sensing chamber and the atmosphere, said hydraulic line extending in a serpentine route such that any fluid that may splash into said hydraulic line during operation will flow back into the sensing chamber.

6. The invention of claim 5, wherein said hydraulic line is operatively coupled to the upper portion of the expansion tank, and said expansion tank includes a vent which exposes the upper portion of the expansion tank to atmospheric pressure.

7. The invention of claim 1, wherein said control mechanism opens said oil return valve when the fluid temperature drops approximately two degrees Fahrenheit.

8. The invention of claim 4, wherein said control mechanism opens both the oil return valve and air vent valve when the fluid temperature drops a significant amount, said open valves allowing the fluid levels within the sensing chamber, main tank and expansion tank to reset themselves corresponding to the change in fluid temperature.

9. A hydraulic fluid leak detector mechanism adapted for detecting leaks in a hydraulic system of a vehicle adapted for mowing, comprising:
   a main fluid tank operatively coupled with said hydraulic system,
   an expansion tank operatively coupled with the main tank for receiving fluid therefrom as the fluid becomes heated and expands,
   a sensing chamber operatively coupled with the main tank,
   a signalling mechanism which signals to an operator when the level of fluid in the sensing chamber has dropped significantly and that a fluid leak may be occurring,
   an oil return valve operatively coupled between the main tank and the expansion tank, said oil return valve having an open position that allows fluid to flow back to the main tank from the expansion tank and a closed position that blocks oil from flowing from the expansion tank to the main tank,
   a temperature sensor for sensing the temperature of the fluid, and
   a control mechanism operatively coupled with the temperature sensor and the oil return valve for briefly shifting the oil return valve to its open position when the temperature sensor detects a significant drop in fluid temperature, said brief opening of the oil return valve generally allowing the fluid levels in the main tank, expansion tank and sensing chamber to reset themselves in response to the change in fluid temperature and volume.

10. The invention of claim 9, and further comprising an expansion check valve operatively positioned between the main tank and the expansion tank for allowing fluid to flow from the main tank to the expansion tank as fluid in the main tank becomes heated and expands, and said expansion check valve blocks fluid from flowing from the expansion tank to the main tank.

11. The invention of claim 9, and further comprising an air vent check valve operatively coupled with the top portion of the sensing chamber for allowing air to enter the sensing chamber to replace oil that has exited the sensing chamber during normal operation of the hydraulic system.

12. The invention of claim 9, and further comprising an air vent valve operatively coupled with the top portion of the sensing chamber, said air vent valve having a closed position for blocking fluid from entering or exiting the sensing chamber via the air vent valve, said air vent valve being automatically shifted to an open position as fluid enters the sensing chamber to thereby allow air to be displaced from the sensing chamber as fluid enters the sensing chamber during normal operation of the hydraulic system.

13. The invention of claim 12, wherein said control mechanism is operatively connected with hydraulic cylinders driven by the hydraulic system, and said control mechanism opens the air vent valve when fluid is flowing out of the hydraulic cylinder and back into the hydraulic system.

14. The invention of claim 9, and further comprising a hydraulic line which operatively extends between the top portion of the sensing chamber and the atmosphere, said hydraulic line extending in a serpentine route such that any fluid that may splash into said hydraulic line during normal operation of the hydraulic system will generally flow back into the sensing chamber.

15. The invention of claim 14, wherein said hydraulic line is operatively coupled to the upper portion of the expansion tank, and said expansion tank includes a vent which exposes the upper portion of the expansion tank to atmospheric pressure.

16. The invention of claim 9, wherein said control mechanism opens said oil return valve when the fluid temperature drops approximately two degrees Fahrenheit.

17. The invention of claim 12, wherein said control mechanism opens both the oil return valve and air vent valve when the fluid temperature drops a significant amount and thereby allows the fluids levels within the sensing chamber, main tank and expansion tank to reset themselves corresponding to the change in fluid temperature.

18. The invention of claim 17, wherein said oil return valve and air vent valve include solenoids controlled by the control mechanism.

19. The invention of claim 9, wherein said temperature sensor is operatively coupled with the main tank for sensing the temperature of hydraulic fluid within the main tank.

20. A hydraulic fluid leak detector mechanism adapted for detecting leaks in a hydraulic system of a vehicle having at least one reel mower cutting unit usable for mowing golf courses, comprising:

a main fluid tank operatively coupled with the hydraulic system for serving as a reservoir, an expansion tank operatively coupled with the main tank for receiving fluid therefrom as the fluid becomes heated and expands, a sensing chamber operatively coupled with the main tank, a signalling mechanism which signals to an operator when the level of fluid in the sensing chamber has dropped significantly and that a fluid leak may be occurring, an oil return valve operatively coupled between the main tank and the expansion tank, said oil return valve having an open position that allows fluid to flow back to the main tank from the expansion tank and a closed position that blocks oil from flowing from the expansion tank to the main tank, an expansion check valve operatively positioned between the main tank and the expansion tank for allowing fluid to flow from the main tank to the expansion tank as fluid in the main tank becomes heated and expands, and said expansion check valve blocks fluid from flowing from the expansion tank to the main tank, an air vent check valve operatively coupled with the top portion of the sensing chamber for allowing air to enter the sensing chamber to replace oil that has exited the sensing chamber during normal operation of the hydraulic system, an air vent valve operatively coupled with the top portion of the sensing chamber, said air vent valve having a closed position for blocking fluid from entering or exiting the sensing chamber via the air vent valve, said air vent valve being automatically shifted to an open position as fluid enters the sensing chamber to thereby allow air to be displaced from the sensing chamber as fluid enters the sensing chamber during normal operation of the hydraulic system, a temperature sensor for sensing the temperature of the fluid, and a control mechanism operatively coupled with the temperature sensor and the oil return valve for shifting the oil return valve to its open position when the temperature sensor detects a significant drop in fluid temperature, said opening of the oil return valve generally allows the fluid levels in the main tank, expansion tank and sensing chamber to reset themselves in response to the change in fluid temperature.

21. The invention of claim 20, and further comprising a hydraulic line which operatively extends between the top portion of the sensing chamber and the atmosphere, said hydraulic line extending in a serpentine route such that any fluid that may splash into said hydraulic line during normal operation of the hydraulic system will generally flow back into the sensing chamber.

22. The invention of claim 21, wherein said hydraulic line is operatively coupled to the upper portion of the expansion tank, and said expansion tank includes a vent which exposes the upper portion of the expansion tank to atmospheric pressure.

23. The invention of claim 22, wherein said control mechanism opens said oil return valve when the fluid temperature drops approximately two degrees Fahrenheit.

24. The invention of claim 23, wherein said control mechanism opens both the oil return valve and air vent valve when the fluid temperature drops a significant amount and thereby allows the fluids levels within the sensing chamber, main tank and expansion tank to reset themselves corresponding to the change in fluid temperature and volume.

25. The invention of claim 24, wherein said oil return valve and air vent valve include solenoids controlled by the control mechanism.

26. The invention of claim 25, wherein said temperature sensor is operatively coupled with the main tank for sensing the temperature of hydraulic fluid within the main tank.

27. The invention of claim 20, wherein said control mechanism is operatively connected with hydraulic cylinders driven by the hydraulic system, and said control mechanism opens the air vent valve when fluid is flowing out of the hydraulic cylinders and back into the hydraulic system.

28. The invention of claim 27, wherein said hydraulic cylinders are lift cylinders for shifting the reel mower cutting units between raised transport positions and lowered operating positions.

* * * * *